(12) United States Patent
Ikeda et al.

(10) Patent No.: US 8,859,134 B2
(45) Date of Patent: Oct. 14, 2014

(54) BATTERY CONNECTOR

(75) Inventors: Tomohiro Ikeda, Makinohara (JP); Keizo Aoki, Makinohara (JP); Yukihisa Kikuchi, Makinohara (JP); Ryuta Takishita, Makinohara (JP); Kaiho Ryu, Makinohara (JP); Masaru Imai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 116 days.

(21) Appl. No.: 13/574,412

(22) PCT Filed: Sep. 16, 2011

(86) PCT No.: PCT/JP2011/071780
§ 371 (c)(1),
(2), (4) Date: Jul. 20, 2012

(87) PCT Pub. No.: WO2012/036318
PCT Pub. Date: Mar. 22, 2012

(65) Prior Publication Data
US 2012/0295485 A1 Nov. 22, 2012

(30) Foreign Application Priority Data

Sep. 16, 2010 (JP) .................. 2010-208087

(51) Int. Cl.
*H01M 2/24* (2006.01)
*H01M 2/10* (2006.01)
*H01M 2/20* (2006.01)
*H01M 10/48* (2006.01)

(52) U.S. Cl.
CPC ............ *H01M 2/206* (2013.01); *H01M 2/1077* (2013.01); *Y02E 60/12* (2013.01); *H01M 10/482* (2013.01)
USPC ........... 429/158; 429/159; 429/160; 439/626; 439/627

(58) Field of Classification Search
CPC ......... H01M 2/24; H01M 6/46; H01M 10/04; H01M 2/20; H01R 13/405
USPC ............ 429/158, 159, 160, 65; 439/626, 627, 439/445, 449, 460, 500
See application file for complete search history.

(56) References Cited

U.S. PATENT DOCUMENTS 4,920,018 A * 4/1990 Turner ........................... 429/65
6,261,719 B1 7/2001 Ikeda et al.
(Continued)

FOREIGN PATENT DOCUMENTS

| EP | 105332 A2 | 12/2000 |
| EP | 1058332 A2 | 12/2000 |

(Continued)

OTHER PUBLICATIONS

International Search Report dated Dec. 22, 2011 issued in International Application No. PCT/JP2011/071780 (PCT/ISA/210).

(Continued)

*Primary Examiner* — Milton I Cano
*Assistant Examiner* — Carmen Lyles-Irving
(74) *Attorney, Agent, or Firm* — Sughrue Mion, PLLC

(57) ABSTRACT

A battery connector includes: a plurality of terminals, each of which is to be connected to each electrode of a plurality of batteries; and a case which contains the plurality of terminals therein. The case includes a terminal fixing part in which the plurality of terminals are fixed, and an insulating cover which is supported to be displaced to a closing position at which an open face of the terminal fixing part is covered by the insulating cover. A wire guide is formed in an outer surface of the insulating cover in the closing position.

9 Claims, 8 Drawing Sheets

(56) References Cited

U.S. PATENT DOCUMENTS

| | | |
|---|---|---|
| 6,479,187 B1 | 11/2002 | Takasaki et al. |
| 2001/0039150 A1 | 11/2001 | Saito et al. |
| 2001/0044241 A1 | 11/2001 | Saito et al. |
| 2001/0046816 A1 | 11/2001 | Saito et al. |
| 2002/0102457 A1 | 8/2002 | Oogami et al. |
| 2010/0255355 A1 | 10/2010 | Park et al. |

FOREIGN PATENT DOCUMENTS

| | | |
|---|---|---|
| JP | 2000-149909 A | 5/2000 |
| JP | 3707595 B2 | 8/2005 |
| JP | 2006-120486 A | 5/2006 |
| JP | 2006269104 A | 10/2006 |
| JP | 2008-243412 A | 10/2008 |
| WO | 2008038916 A1 | 4/2008 |

OTHER PUBLICATIONS

Written Opinion dated Dec. 22, 2011 issued in International Application No. PCT/JP2011/071780 (PCT/ISA/237).

Office Action dated Dec. 23, 2013 issued by the State Intellectual Property of P.R. China in corresponding Chinese Patent Application No. 201180004152.3.

Notification, dated Feb. 26, 2014, issued by the Japanese Patent Office in counterpart Japanese Application No. 2010-208087.

Office Action issued on Aug. 18, 2014 in corresponding Chinese patent application No. 201180004152.3.

* cited by examiner

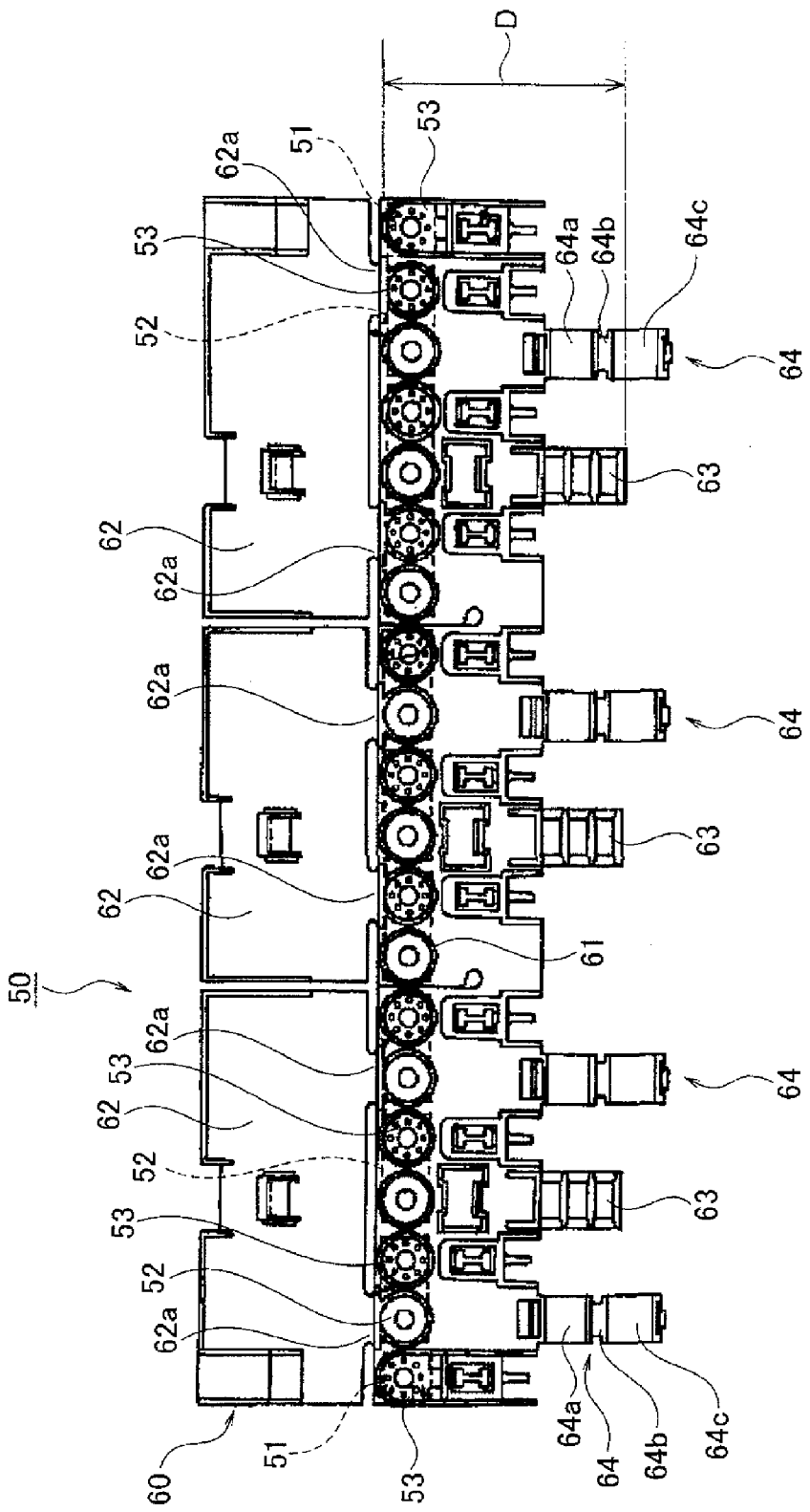

BATTERY CONNECTOR

CROSS REFERENCE TO RELATED APPLICATIONS

This application is a National Stage entry of International Application No. PCT/JP2011/071780 filed Sep. 16, 2011, claiming the benefit of Application No. JP 2010-208087 filed Sep. 16, 2010, in the Japanese Patent Office (JPO), the disclosures of which are incorporated herein in their entirety.

TECHNICAL FIELD

The present invention relates to a battery connector for making a connection between electrodes of a plurality of batteries.

BACKGROUND ART

In recent electric vehicles and hybrid vehicles, a battery assembly is mounted as a compact power supply having a high power and a high output. A battery connector is used, for example, to serially connect a plurality of batteries of the battery assembly.

An example of the battery connector is disclosed in Patent Literature 1. In a battery assembly applied to the battery connector, a plurality of batteries which include plus electrodes (in a bolt-like shape) and minus electrodes (in a bolt-like shape) on opposing surfaces are layered so that, for example, the plus electrodes and the minus electrodes are alternately aligned on the same surface. A pair of battery connectors is used to serially connect the plurality of batteries which are layered. One of the pair of battery connectors is shown in FIG. 7 and FIG. 8.

In FIG. 7 and FIG. 8, a battery connector 50 includes a plurality of terminals 51, 52 to be connected to each electrode (not shown in figures) of the batteries, a plurality of voltage detection terminals 53 which are partly superimposed on the respective terminals 51, 52, and a case 60 which covers the plurality of terminals 51, 52 and the voltage detection terminals 53. The battery connector 50 is formed by insert-forming the case 60 while considering the plurality of terminals 51, 52 and the voltage detection terminals 53 as insert-parts.

The plurality of terminals 51, 52 includes two types of terminals. One is end terminals 51 for connecting to both ends electrodes of the battery serial connection, and the other one is electrode-connection terminals 52 for connecting to intermediate electrodes except for the both ends. Each of the end terminals 51 has one hole, and is connected and fastened by a nut to the farthest end electrode of the serially-connected batteries. The voltage detection terminal 53 and a power terminal 70 are connected and fastened together to the end terminal 51. Each of the electrode-connection terminals 52 has two holes, and is connected and fastened by a nut to each electrode of adjacent batteries. In one nut fastening, the voltage-connection terminal 53 is fastened together.

The case 60 includes a terminal fixing part 61 which fixes the plurality of terminals 51, 52 and the voltage detection terminals 53, three-divided insulating covers 62 which are linked to the terminal fixing part 61 via hinges 62a, and a plurality of first wire guides 63 and second wire guides 64 which are extended from an edge of the terminal fixing part 61 along a width direction of the case 60.

The plurality of terminals 51, 52 are fixed on the terminal fixing part 61 in a line to be spaced from one another. The plurality of voltage detection terminals 53 are also fixed on the terminal fixing part 61 to be partly superimposed on the terminals 51, 52.

Each of the insulating covers 62 is rotatably displaced about the hinge 62a as a fulcrum to a closing position for covering an open face of the terminal fixing part 61.

Each of the first wire guides 3 is formed in a groove-shape. The first wire guide 63 guides an electric wire W connected to the power terminal 70 along a predetermined path.

Each of the second wire guides 64 includes a tub part 64a, a hinge part 64b, and a lid part 64c which is capable of covering an open face of the tub part 64a. The second wire guide 64 guides an electric wire W connected to the voltage detection terminal 53 along a predetermined path.

In the other of the battery connectors, all of the plurality of terminals are constituted by electrode-connection terminals.

According to the above example, since the plurality of terminals 51, 52, etc. exposed from the terminal fixing part 51 can be covered by the insulating cover 62, accidents such as short-circuit can be avoided as much as possible. Further, since the electric wire W connected to the terminal fixing part 61 (in particular, an electric wire connected to the voltage detection terminal 53 or the power terminal 70) is orderly drawing along the predetermined routing path by the first wire guide 63 and the second wire guide 64, handling the electric wire W, etc. is easy.

CITATION LIST

Patent Literature

Patent Literature 1: JP-B-3707595 (JP-A-2000-149909)

SUMMARY OF INVENTION

Technical Problem

In the battery connector 50, however, since the first wire guides 63 and the second wire guides 64 are extended in width direction of the terminal fixing part 61, a width dimension D (shown in FIG. 7) of the battery connector 50 at the location of the wire guide is enlarged.

The present invention is achieved to solve the problems, and an object of the present invention is to provide a battery connector, the width dimension of which at the location of the wire guide can be made small.

Solution to Problem

An aspect of the present invention provides a battery connector, including: a plurality of terminals, each of which is to be connected to each electrode of a plurality of batteries; and a case which contains the plurality of terminals therein, wherein the case includes a terminal fixing part in which the plurality of terminals are fixed, and an insulating cover which is supported to be displaced to a closing position at which an open face of the terminal fixing part is covered by the insulating cover, wherein a wire guide is formed in an outer surface of the insulating cover in the closing position.

The battery connector may be configured so that the case includes a completely-locking cover which is supported to be displaced to a closing position at which an open face of the wire guide in the closing position is covered by the completely-locking cover to restrict a displacement of the insulating cover toward an opening position.

The battery connector may be configured so that the case includes a temporarily-locking cover which is located in an open face side of the wire guide in the closing position, and is supported to be displaced to a closing position at which the insulating cover is locked to restrict a displacement of the insulating cover toward the opening position in an opening position of the completely-locking cover.

The battery connector may be configured so that the insulating cover includes a first locking arm claw, and the first locking arm claw is locked in a first locking part of the terminal fixing part when the insulating cover is rotated to the closing position.

The battery connector may be configured so that the completely-locking cover includes a second locking arm claw, and the second locking arm claw is locked in a second locking part of the terminal fixing part when the completely-locking cover is rotated to the closing position.

The battery connector may be configured so that the temporarily-locking cover includes a locking claw, and the locking claw is locked in a locking part of the insulating cover when the temporarily-locking cover is rotated to the closing position.

Advantageous Effects of Invention

According to the aspect of the invention, since the wire guide is disposed over the terminal fixing part, the width dimension of the battery connector at the location of the wire guide can be made small.

BRIEF DESCRIPTION OF DRAWINGS

FIG. 7 is a front view of a battery connector, for showing a related art example.

DESCRIPTION OF EMBODIMENTS

Here, an embodiment of the present invention will be explained with reference to accompanying drawings.

Figure 1:
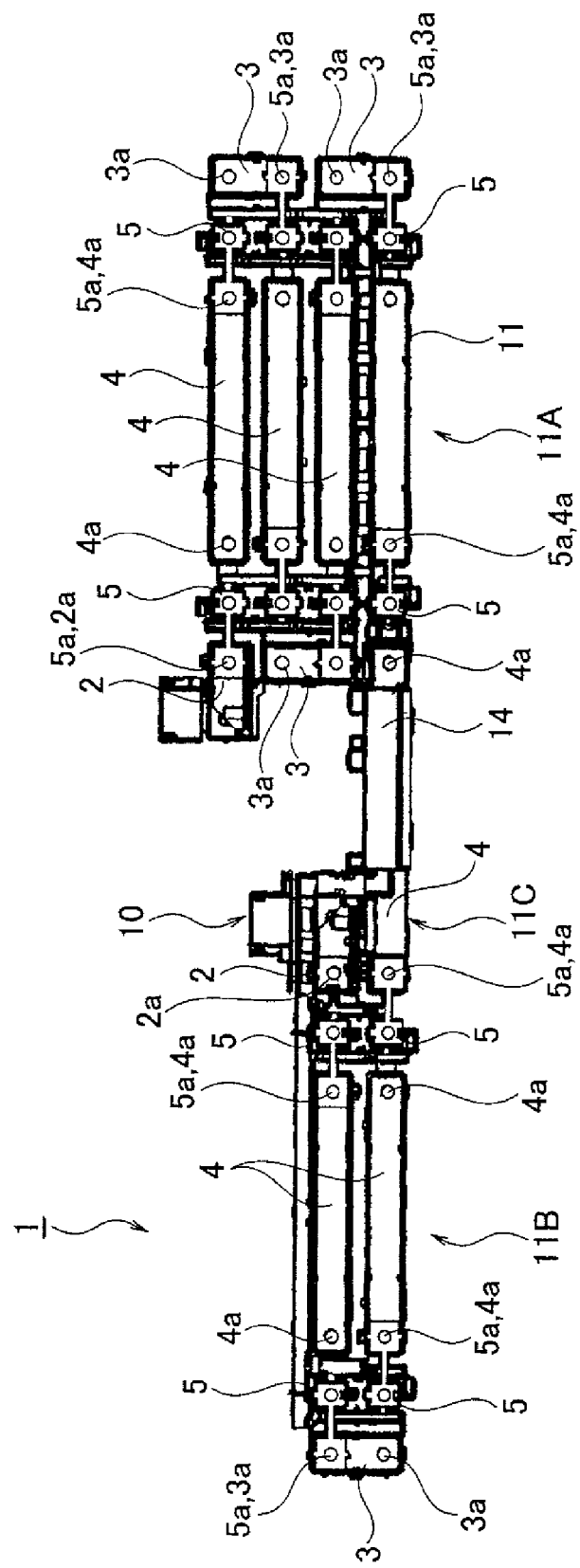
FIG. 1 is a front view of a battery connector, for showing a first embodiment of the invention.
Figure 2:
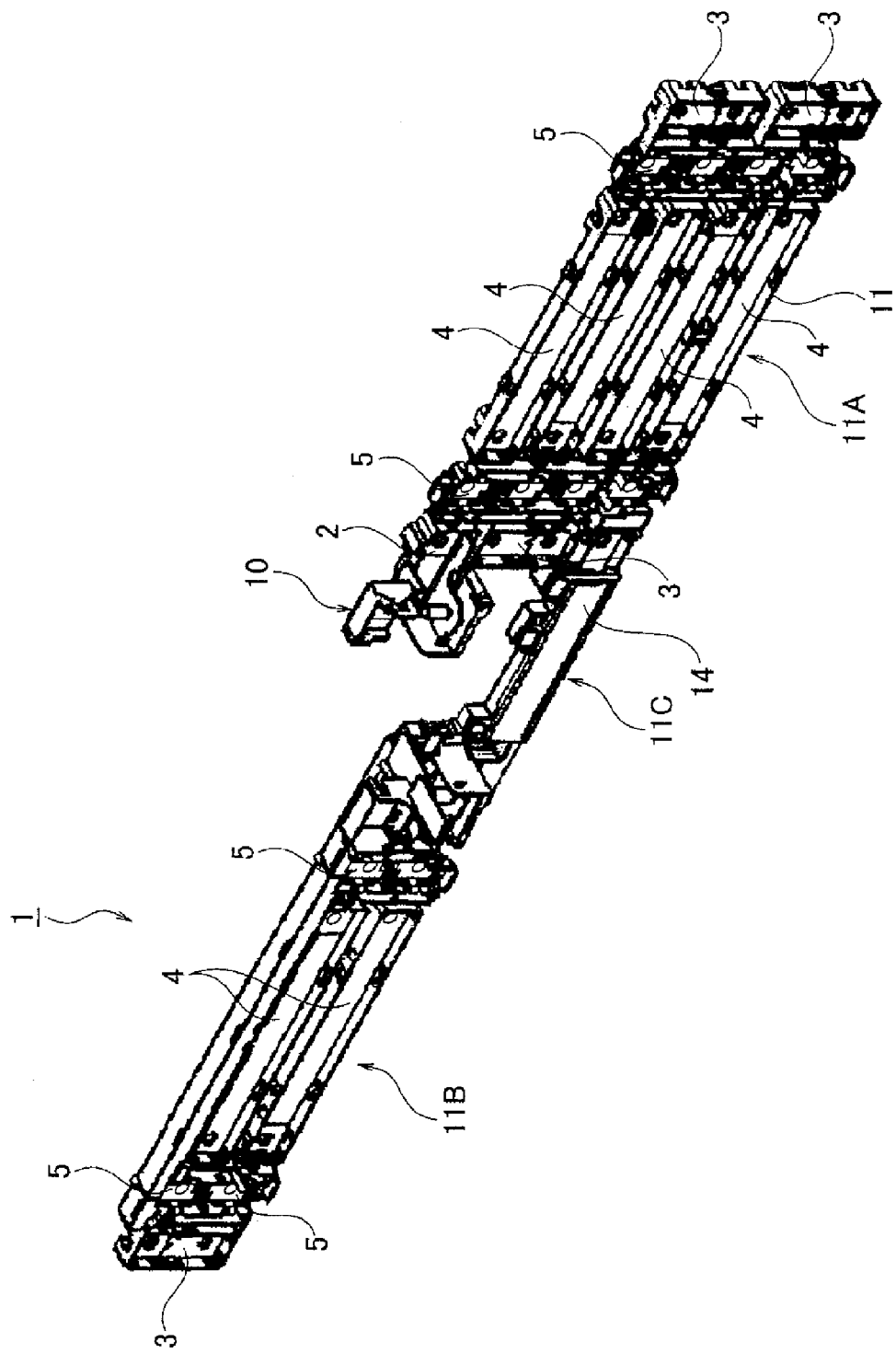
FIG. 2 is a perspective view of the battery connector, for showing the first embodiment of the invention.

A battery assembly includes a plurality of batteries which include plus electrodes (in a bolt-like shape) and minus electrodes (in a bolt-like shape) on opposing surfaces. The plurality of batteries are horizontally disposed in eight lines, and four stages are layered over the right side four lines of the eight lines, and two stages are layered over the left side four lines of the eight lines. The batteries adjacent to each other in the horizontal direction and the vertical direction are disposed so that the plus electrodes and the minus electrodes are alternately aligned on the same side. A pair of battery connectors is used to serially connect the plurality of batteries which are layered. One of the pair of battery connectors is shown in FIG. 1 and FIG. 2. Hereinafter, an explanation is made.

In FIG. 1 and FIG. 2, a battery connector 1 includes a plurality of terminals 2, 3, 4 to be connected to each electrode (not shown in figures) of the batteries, a plurality of voltage detection terminals 5 which are partly superimposed on the respective terminals 2, 3, 4, and a case 10 which covers the plurality of terminals 2, 3, 4 and the voltage detection terminals 5.

The plurality of terminals 2, 3, 4 are formed by a bus bar. The plurality of terminals 2, 3, 4 include two end terminals 2, four short-dimensional electrode-connection terminals 3, and seven long-dimensional electrode-connection terminals 4. Each of the two end terminals 2 has one bolt-hole 2a, and is connected and fastened by a nut to the farthest end electrode (not shown in figures) of the serially-connected batteries. A power terminal (not shown in figures) and the voltage detection terminal 5 are fastened together to one of the end terminals 2. Only a power terminal (not shown in figures) is fastened together to the other of the end terminals 2. Each of the two types of electrode-connection terminals 3, 4 has two bolt-holes 3a, 4a, and is connected and fastened by a nut to each electrode of adjacent batteries. The voltage detection terminal 5 is fastened together to each of the electrode-connection terminals 3, 4. Each of the plurality of voltage detection terminals 5 has a bolt-hole 5a at a position where each of the terminals 2, 3, 4 is superimposed.

The case 10 is formed by injection molding from insulating synthetic resin material. The case 10 includes a terminal fixing part 11 with which the plurality of terminals 2, 3, 4 and the voltage detection terminals 5 are engaged. The terminal fixing part 11 includes, as shown in FIG. 1 and FIG. 2, a right block 11A, a left block 11B, and a center linking block 11C which links the right and left blocks 11A, 11B. In the right block 11A, one end terminal 2, three short-dimensional electrode-connection terminals 3, four long-dimensional electrode-connection terminals 4 and eight voltage detection terminals 5 are engaged. In the left block 11B, one end terminal 2, one short-dimensional electrode-connection terminal 3, two long-dimensional electrode-connection terminals 4 and four voltage detection terminals 5 are engaged. In the center linking block 11C, one long-dimensional electrode-connection terminal 4 is engaged.

Figure 3A:
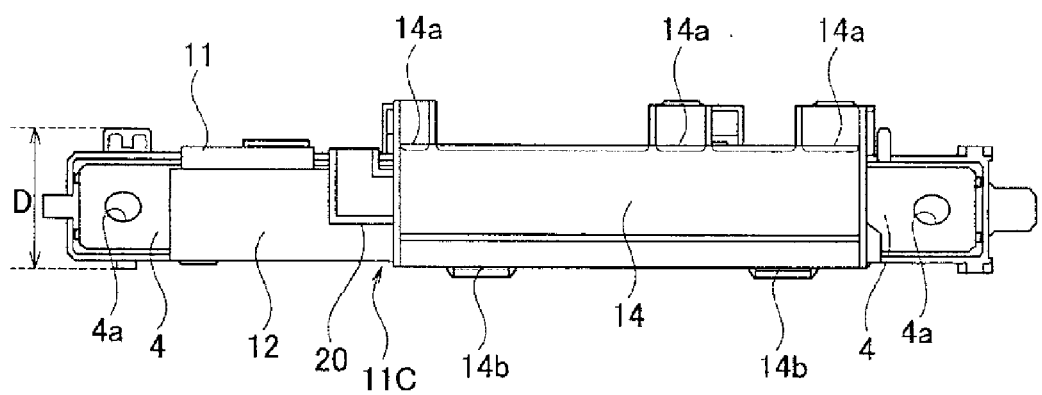
FIG. 3A is a partial front view of the assembled battery connector.
Figure 3B:
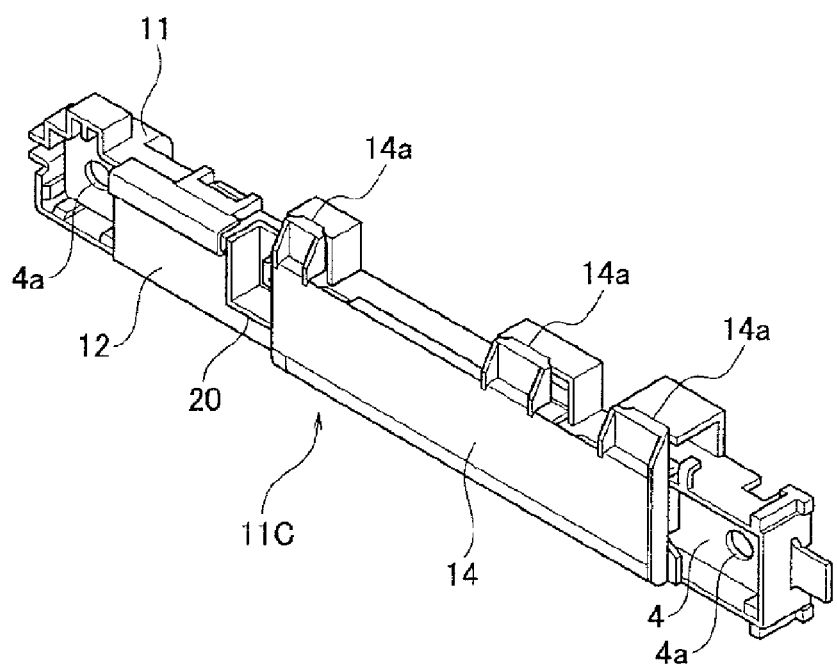
FIG. 3B is a partial perspective view of the assembled battery connector.

As shown in FIG. 3 and FIG. 4, a insulating cover 12, a pair of temporarily-locking covers 13, and a completely-locking cover 14 are integrally provided in the center linking block 11C of the terminal fixing part 11.

The insulating cover 12 is connected from a lower edge of the terminal fixing part 11 via hinges 12a. The insulating cover 12 is rotatably displaced between a closing position at which the insulating cover 12 covers an open face of the terminal fixing part 11, and an opening position at which the insulating cover 12 does not cover the open face of the terminal fixing part 11. The insulating cover 12 includes first locking arm claws 12b. When the insulating cover 12 is rotated to the closing position, the first locking arm claws 12b are locked in first locking parts 11a of the terminal fixing part 11.

The insulating cover 12 includes a wire guide 20. The wire guide 20 is formed in an outer surface of the insulating cover 12 when the insulating cover 12 is in the closing position. The wire guide 20 has a tube-shape which is open in one side. An electric wire W connected to the voltage detection terminal 5 or the power terminal (not shown in figures) is routed a guided along the wire guide 20. In this way, the electric wire W is drawn from the terminal fixing part orderly along a predetermined path.

The pair of temporarily-locking covers 13 are connected from an upper edge of the terminal fixing part 11 via respective hinges 13$a$. The pair of temporarily-locking covers 13 are rotatably displaced between a closing position at which the temporarily-locking covers 13 cover the open face of the wire guide 20 at the closing position, and an opening position at which the temporarily-locking covers 13 do not cover the open face of the wire guide 20 at the closing position. At the closing position, the pair of temporarily-locking covers 13 cover only a part of the open face of the wire guide 20. Each of the temporarily-locking covers 13 includes a locking claw 13$b$. When the temporarily-locking cover 13 is rotated to the closing position, the locking claw 13$b$ is locked in a locking part 12$c$ of the insulating cover 12.

The completely-locking cover 14 is connected from an upper edge of the center linking block 11C of the terminal fixing part 11 via hinges 14$a$. The completely-locking cover 14 is rotatably displaced between a closing position at which the completely-locking cover 14 covers the open face of the wire guide 20 at the closing position, and an opening position at which the completely-locking cover 14 do not cover the open face of the wire guide 20 at the closing position. At the closing position, the completely-locking cover 14 covers almost the whole of the open face of the wire guide 20. The completely-locking cover 14 includes a second locking arm claw 14$b$. When the completely-locking cover 14 is rotated to the closing position, the second locking arm claw 14$b$ is locked in a second locking part 11$b$ of the terminal fixing part 11.

Next, assembling procedure of the battery connector 1 will be explained. A fixing work of the battery connector 1 to each electrode of the batteries is omitted.

Figure 4A:
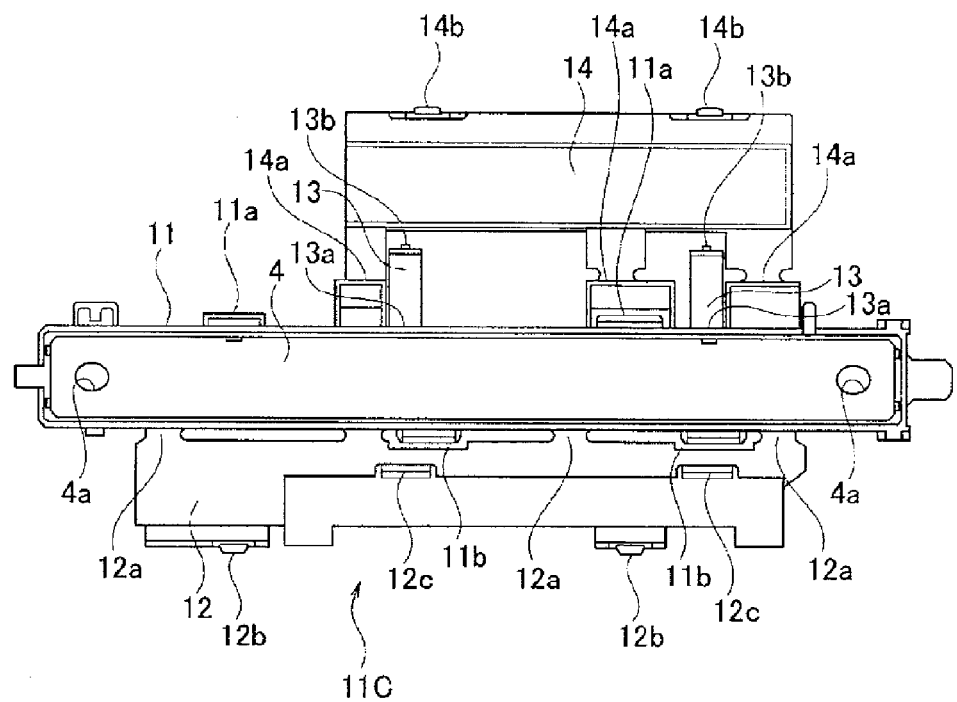
FIG. 4A is a partial front view of the battery connector to which a terminal is assembled.
Figure 4B:
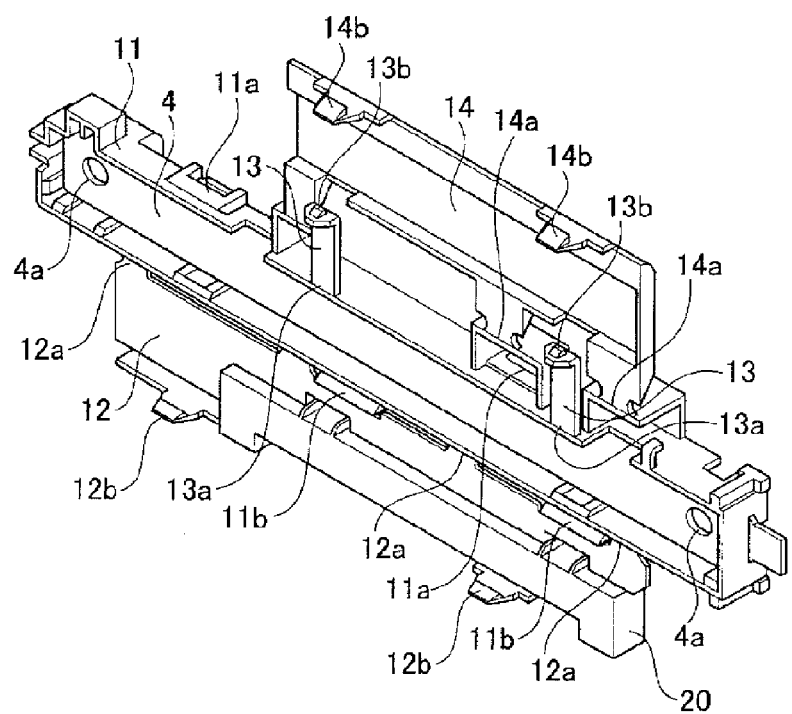
FIG. 4B is a partial perspective view of the battery connector to which the terminal is assembled.

First, the terminals 2, 3, 4 and the voltage detection terminals 5 are engaged to the terminal fixing part 11 of the case 10, which has been formed by injection-molding. As shown in FIG. 4A and FIG. 4B, the electrode-connection terminal 4 is engaged to the center linking block 11C of the terminal fixing part 11 while the insulating cover 12, the temporarily-locking covers 13 and the completely-locking cover 14 are all in the opening positions.

Figure 5A:
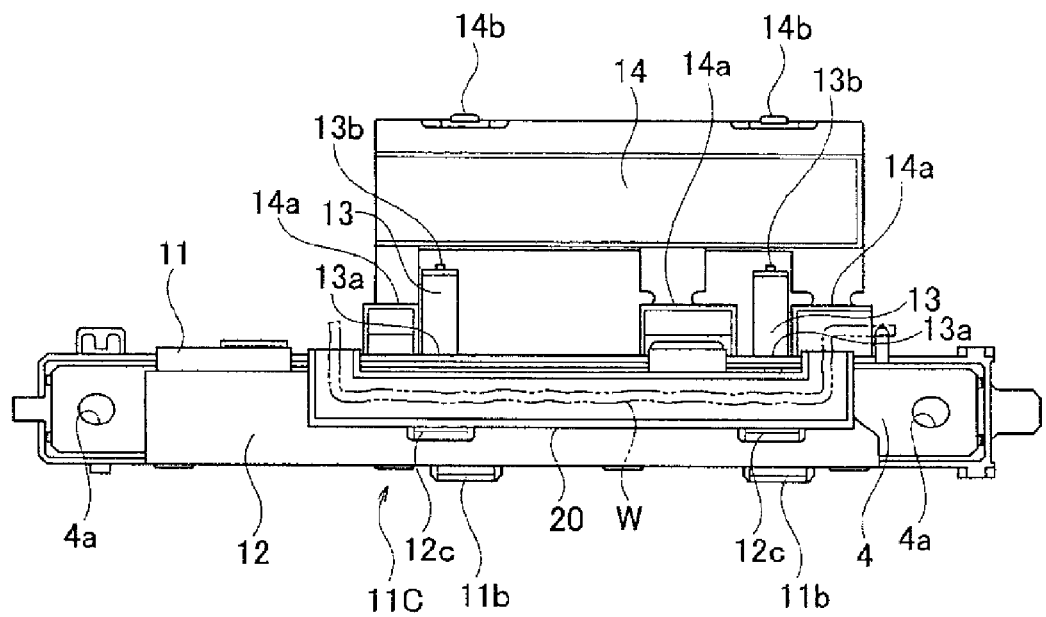
FIG. 5A is a partial front view of the battery connector in which an insulating cover is closed.
Figure 5B:
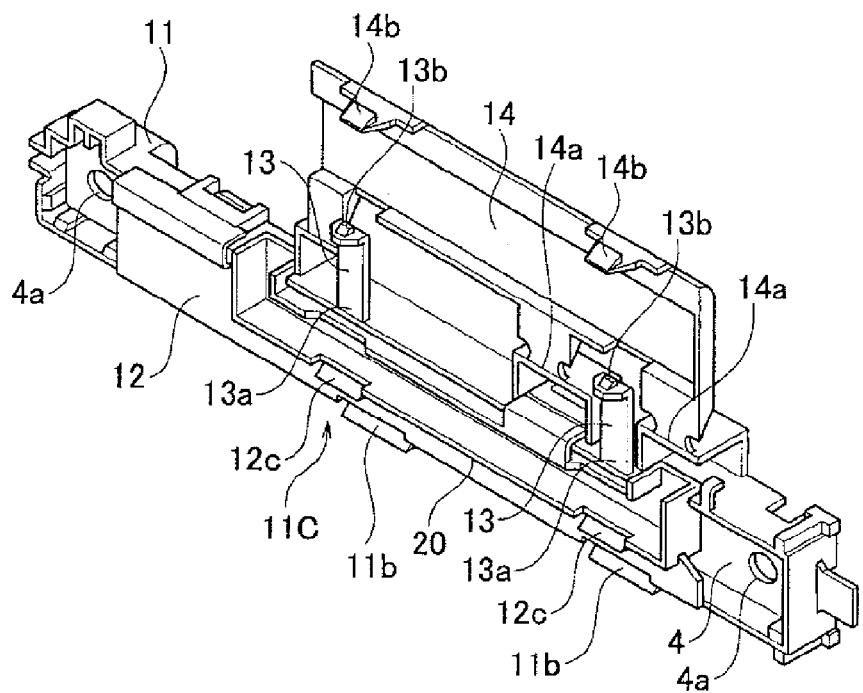
FIG. 5B is a partial perspective view of the battery connector in which the insulating cover is closed.

Next, as shown in FIG. 5A and FIG. 5B, the insulating cover 12 is rotated from the opening position to the closing position. Then, locking arm claws 14$b$ are locked in the first locking parts 11$a$, respectively, and the insulating cover 12 is locked in the closing position. In this way, the open face of the terminal fixing part 11 is covered by the insulating cover 12.

Next, as shown by virtual lines in FIGS. 5A and 5B, the electric wire W is routed within the wire guide 20.

Figure 6A:
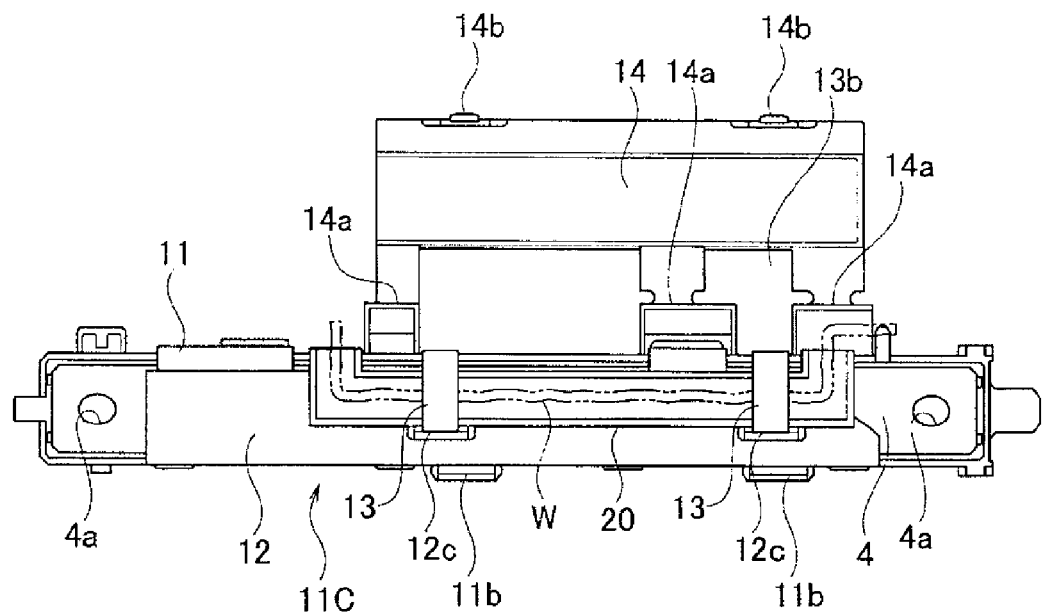
FIG. 6A is a partial front view of the battery connector in which an electric wire is routed within a wire guide, and a temporarily-locking cover is closed.
Figure 6B:
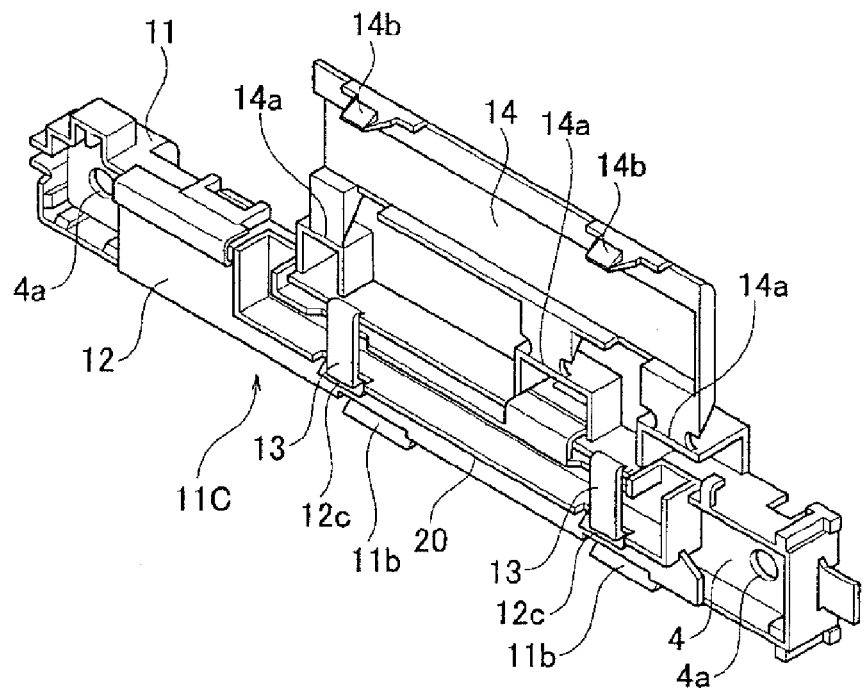
FIG. 6B is a partial perspective view of the battery connector in which the electric wire is routed within the wire guide, and the temporarily-locking cover is closed.
Figure 8:
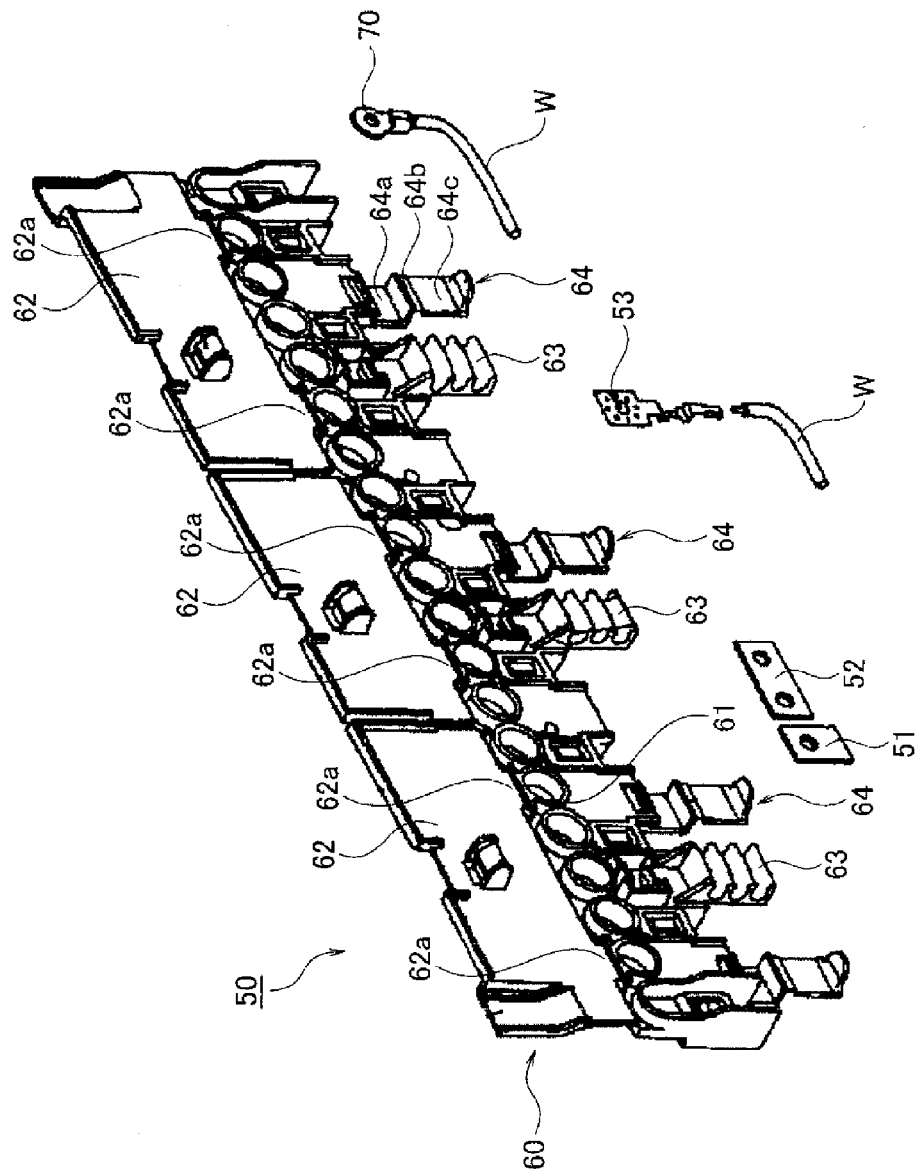
FIG. 8 is a perspective view of the battery connector, for showing the related art example.

Next, as shown in FIG. 6A and FIG. 6B, the pair of temporarily-locking covers 13 are rotated from the opening position to the closing position. Then, the locking claws 13$b$ are locked in the locking parts 12$c$, and each of the temporarily-locking covers 13 is locked in the closing position. In this way, the open face of the wire guide 20 is partly covered by the pair of temporarily-locking covers 13. Moreover, the electric wire W routed within the wire guide 20 is temporarily retained without being dropped from the wire guide 20.

Next, as shown in FIG. 3, the completely-locking cover 14 is rotated from the opening position to the closing position. Then, the locking arm claws 14$b$ are locked in the second locking parts 11$b$, respectively, and the completely-locking cover 14 is locked in the closing position. The assembly is finished.

As explained above, the case 10 includes the terminal fixing part 11 in which the plurality of terminals 2, 3, 4 are fixed and the insulating cover 12 which is supported to be displaced by rotation to the closing position at which the open face of the terminal fixing part 11 is covered by the insulating cover 12 and a wire guide 20 is formed in an outer surface of the insulating cover 12 in the closing position. According to the configuration, since the wire guide 20 is disposed over the terminal fixing part 11, a width dimension (shown in FIG. 3A) of the battery connector 1 at the location of the wire guide can be made small.

The case 10 includes the completely-locking cover 14 which is supported to be displaced by rotation to the closing position at which the open face of the wire guide 20 in the closing position is covered by the completely-locking cover 14. According to the configuration, since the displacement of the insulating cover 12 in the closing position toward the opening position is restricted by the completely-locking cover 14, defective insulation of the terminal 4 due to the displacement of the insulating cover 12 toward the opening position can be avoided. Further, since the open face of the wire guide 20 is covered by the completely-locking cover 14, dropping of the electric wire W from the wire guide 20 can be avoided. That is, the completely-locking cover 14 has a function of completely-locking the insulating cover 12 and a function of covering the wire guide 20 with lid (a function of preventing the electric wire W from being dropped).

The case 10 includes the temporarily-locking cover 13 which is supported to be displaced by rotation to the closing position at which the open face of the wire guide 20 in the closing position is covered by the temporarily-locking cover 13 in an opening position of the completely-locking cover 14. According to the configuration, since the displacement of the insulating cover 12 in the closing position toward the opening position is restricted by the temporarily-locking cover 13 at a previous working stage where the completely-locking cover 14 is displaced to the closing position, the workability can be enhanced. Further, dropping of the electric wire W from the wire guide 20 during an intermediate process of assembly can be avoided. That is, the temporarily-locking cover 13 has a function of temporarily-locking the insulating cover 12 and a function of temporarily covering the wire guide 20 with lid (a function of temporarily preventing the electric wire W from being dropped).

In the embodiment, the battery connector 1 includes the plurality of voltage detection terminals 5, the number of which is correspondence with the number of batteries. Thus, a user can check the output voltage for each battery unit of the battery assembly, and easily find defective batteries.

In the embodiment, the wire guide 20 is provided at one position, but it may be provided at plural positions. Further, as is the case in the related art, the wire guides 20 may be separately provided for the electric wire for voltage detection and for the electric wire for power extraction.

In the embodiment, the terminals 2, 3, 4 are fixed in the case 10 by engagement. Alternatively, as is the case in the related art, the terminals 2, 3, 4 may be formed as insert parts, and they may be fixed in the case 10 by insert-molding the case 10.

The form of the battery connector 1 can be arbitrarily modified depending on the way of the batteries layer, or the way of the electrodes arrangement.

INDUSTRIAL APPLICABILITY

The present invention is useful to provide a compact-size battery connector having high reliability, tolerance, and safety, for example, in a small space in a vehicle.

REFERENCE SIGNS LIST

1: Battery connector
2, 3, 4: Terminal
10: Case
11: Terminal fixing part
12: Insulating cover
13: Temporarily-locking cover
14: Completely-locking cover

The invention claimed is:

1. A battery connector, comprising:
a plurality of terminals, each of which is to be connected to each electrode of a plurality of batteries; and
a case which contains the plurality of terminals therein, wherein
the case includes a terminal fixing part in which the plurality of terminals are fixed, and an insulating cover which includes a first surface and a second surface opposite to the first surface, and is supported to be displaced in a closing position at which an open face of the terminal fixing part is covered by the insulating cover and faces the first surface of the insulating cover,
wherein the insulating cover includes a wire guide formed on a side of the second surface of the insulating cover.

2. The battery connector according to claim 1, wherein
the case includes a completely-locking cover which is supported to be displaced to a closing position at which an open face of the wire guide in the closing position is covered by the completely-locking cover to restrict a displacement of the insulating cover toward an opening position.

3. The battery connector according to claim 2, wherein
the case includes a temporarily-locking cover which is located in an open face side of the wire guide in the closing position, and is supported to be displaced to a closing position at which the insulating cover is locked to restrict a displacement of the insulating cover toward the opening position in an opening position of the completely-locking cover.

4. The battery connector according to claim 1, wherein
the insulating cover includes a first locking arm claw, and
the first locking arm claw is locked in a first locking part of the terminal fixing part when the insulating cover is rotated to the closing position.

5. The battery connector according to claim 2, wherein
the completely-locking cover includes a second locking arm claw, and
the second locking arm claw is locked in a second locking part of the terminal fixing part when the completely-locking cover is rotated to the closing position.

6. The battery connector according to claim 3, wherein
the temporarily-locking cover includes a locking claw, and
the locking claw is locked in a locking part of the insulating cover when the temporarily-locking cover is rotated to the closing position.

7. The battery connector according to claim 1, wherein
the wire guide is disposed over the terminal fixing part when the insulating cover is in the closing position.

8. The battery connector according to claim 1, wherein
the wire guide has a tube-shape which is open on one side.

9. The battery connector according to claim 1, wherein
the insulating cover is rotatably displaced via a hinge.

* * * * *